(12) United States Patent
Spencer et al.

(10) Patent No.: US 9,969,249 B2
(45) Date of Patent: May 15, 2018

(54) TONNEAU COVER SYSTEM WITH SIDE RAIL MOUNTED LATCHES AND A REAR HEADER MOUNTED RELEASE ACTUATOR

(71) Applicant: Truxedo, Inc., Yankton, SD (US)

(72) Inventors: Michael R. Spencer, Hubbard, NE (US); William R. Cohoon, Whitmore Lake, MI (US)

(73) Assignee: Truxedo, Inc., Yankton, SD (US)

( * ) Notice: Subject to any disclaimer, the term of this patent is extended or adjusted under 35 U.S.C. 154(b) by 67 days.

(21) Appl. No.: 15/270,705

(22) Filed: Sep. 20, 2016

(65) Prior Publication Data

US 2018/0079287 A1 Mar. 22, 2018

(51) Int. Cl.
| | |
|---|---|
| *B60J 7/10* | (2006.01) |
| *B60J 7/06* | (2006.01) |
| *B60J 7/185* | (2006.01) |
| *B62D 33/04* | (2006.01) |

(52) U.S. Cl.
CPC .............. *B60J 7/102* (2013.01); *B60J 7/068* (2013.01); *B60J 7/104* (2013.01); *B60J 7/185* (2013.01); *B62D 33/04* (2013.01)

(58) Field of Classification Search
CPC ... B60J 7/102; B60J 7/104; B60J 7/185; B60J 7/068; B60J 7/062; B60J 7/085
USPC .......................... 296/100.15, 100.16, 100.18
See application file for complete search history.

(56) References Cited

U.S. PATENT DOCUMENTS

| | | | |
|---|---|---|---|
| 4,607,876 A | 8/1986 | Reed | |
| 4,730,866 A | 3/1988 | Nett | |
| 4,991,640 A | 2/1991 | Verkindt et al. | |
| 5,076,338 A | 12/1991 | Schmeichel et al. | |
| 5,096,250 A | 3/1992 | Menz | |
| 5,165,750 A | 11/1992 | Pirhonen | |
| 5,174,353 A | 12/1992 | Schmeichel et al. | |
| 5,207,262 A | 5/1993 | Rushford | |

(Continued)

FOREIGN PATENT DOCUMENTS

| | | |
|---|---|---|
| CA | 2746916 A1 | 1/2012 |
| CN | 104827873 A | 8/2015 |
| WO | WO2013/056124 A1 | 4/2013 |

OTHER PUBLICATIONS

TruXedo "Deuce2" tonneau cover system "Owner's Manual" (P/N 1117648 Rev V) was publically available on or before Sep. 13, 2013.*

(Continued)

*Primary Examiner* — Jason S Morrow
(74) *Attorney, Agent, or Firm* — Harness, Dickey & Pierce, P.L.C.

(57) ABSTRACT

A latch can be movably mounted to each of the side rails for movement between an unlocked position and a locked position. A release actuator can be movably mounted to the rear header to extend adjacent both latches for movement between a non-release position and a release position. When the rear header is seated in the rear header seat and the release actuator is in the non-release position, each latch engages the rear header in the locked position to lock the rear header and side rails together. When the rear header is seated in the rear header seat and the release actuator is moved toward the release position, the release actuator engages both latches and moves the latches to the unlocked position to unlock the rear header from both of the side rails.

20 Claims, 9 Drawing Sheets

(56) References Cited

U.S. PATENT DOCUMENTS

| | | |
|---|---|---|
| 5,228,736 A | 7/1993 | Dutton |
| 5,251,951 A | 10/1993 | Wheatley |
| 5,275,458 A | 1/1994 | Barben et al. |
| 5,301,995 A | 4/1994 | Isler |
| 5,365,994 A | 11/1994 | Wheatley |
| 5,460,423 A | 10/1995 | Kersting et al. |
| 5,472,256 A | 12/1995 | Tucker |
| 5,584,521 A | 12/1996 | Hathaway |
| 5,655,807 A | 8/1997 | Rosario |
| 5,772,273 A | 6/1998 | Wheatley |
| 5,860,691 A | 1/1999 | Thomsen et al. |
| 5,906,407 A | 5/1999 | Schmeichel |
| 6,024,401 A | 2/2000 | Wheatley |
| 6,053,556 A | 4/2000 | Webb |
| 6,053,558 A | 4/2000 | Weldy et al. |
| 6,257,647 B1 | 7/2001 | Ninnell et al. |
| 6,293,608 B1 | 9/2001 | Dicke et al. |
| 6,386,616 B1 | 5/2002 | Wheatley |
| 6,543,835 B2 | 4/2003 | Schmeichel et al. |
| 6,568,740 B1 | 5/2003 | Dimmer |
| 6,575,520 B1 | 6/2003 | Spencer |
| 6,585,309 B2 | 7/2003 | Dicke |
| 6,607,234 B1 | 8/2003 | Schmeichel |
| 6,619,719 B1 | 9/2003 | Wheatley |
| 6,669,264 B1 | 12/2003 | Tucker |
| 6,672,644 B2 | 1/2004 | Schmeichel |
| 6,719,353 B1 | 4/2004 | Isler et al. |
| 6,752,449 B1 | 6/2004 | Wheatley |
| 6,808,220 B2 | 10/2004 | Wheatley |
| 6,808,221 B2 | 10/2004 | Wheatley |
| 6,811,203 B2 | 11/2004 | Wheatley |
| 6,814,388 B2 | 11/2004 | Wheatley |
| 6,814,389 B2 | 11/2004 | Wheatley |
| 6,824,191 B2 | 11/2004 | Wheatley |
| 6,851,738 B1 | 2/2005 | Schmeichel et al. |
| 6,893,073 B2 | 5/2005 | Wheatley |
| 6,976,724 B2 | 12/2005 | Wheatley |
| 7,008,000 B1 | 3/2006 | Schmeichel |
| 7,011,284 B2 | 3/2006 | Melius |
| 7,025,403 B2 | 4/2006 | Wheatley |
| 7,048,277 B1 | 5/2006 | Schmeichel |
| 7,066,524 B2 | 6/2006 | Schmeichel et al. |
| 7,104,586 B2 | 9/2006 | Schmeichel et al. |
| 7,150,490 B2 | 12/2006 | Malmberg et al. |
| 7,165,803 B2 | 1/2007 | Malmberg et al. |
| 7,188,888 B2 | 3/2007 | Wheatley |
| 7,204,540 B2 | 4/2007 | Wheatley |
| 7,384,090 B1 | 6/2008 | Weldy |
| 7,427,095 B2 | 9/2008 | Wheatley |
| 7,445,264 B2 | 11/2008 | Spencer et al. |
| 7,472,941 B2 | 1/2009 | Schmeichel et al. |
| 7,484,790 B2 | 2/2009 | Wheatley |
| 7,604,282 B2 | 10/2009 | Spencer et al. |
| 7,607,714 B2 | 10/2009 | Wheatley |
| 7,621,582 B2 | 11/2009 | Schmeichel et al. |
| RE41,078 E | 1/2010 | Schmeichel |
| 7,815,239 B1 | 10/2010 | Schmeichel et al. |
| 7,828,361 B1 | 11/2010 | Spencer |
| 8,033,591 B2 | 10/2011 | Schmeichel et al. |
| 8,083,281 B2 | 12/2011 | Schmeichel et al. |
| 8,128,149 B1 | 3/2012 | Wolf |
| 8,146,981 B2 | 4/2012 | Huotari et al. |
| 8,167,353 B2 | 5/2012 | Schmeichel et al. |
| 8,186,740 B2 | 5/2012 | Huotari et al. |
| 8,328,267 B2 | 12/2012 | Schmeichel et al. |
| 8,336,946 B2 | 12/2012 | Schrader et al. |
| 8,439,423 B2 | 5/2013 | Schmeichel et al. |
| 8,475,096 B2 | 7/2013 | Spencer et al. |
| 8,523,266 B2 | 9/2013 | Yue |
| 8,567,843 B2 | 10/2013 | Schmeichel et al. |
| 8,573,678 B2 | 11/2013 | Yue |
| 8,596,708 B2 | 12/2013 | Schmeichel |
| 8,632,114 B2 | 1/2014 | Yue |
| 8,714,622 B2 | 5/2014 | Spencer et al. |
| 8,857,887 B1 | 10/2014 | Schmeichel |
| 8,939,494 B2 | 1/2015 | Maimin et al. |
| 9,045,069 B2 | 6/2015 | Schmeichel et al. |
| 9,056,542 B2 | 6/2015 | Schmeichel |
| 9,067,481 B2 | 6/2015 | Xu |
| 9,120,413 B2 | 9/2015 | Fink |
| 9,260,139 B2 | 2/2016 | Schmeichel |
| 9,278,611 B2 | 3/2016 | Maimin et al. |
| 9,393,854 B2 | 7/2016 | Schmeichel et al. |
| 9,604,524 B1 * | 3/2017 | Carlson |
| 2002/0096910 A1 | 7/2002 | Schmeichel et al. |
| 2004/0150246 A1 | 8/2004 | Wheatley |
| 2005/0146158 A1 * | 7/2005 | Schmeichel ............ B60J 7/102 296/100.16 |
| 2007/0205629 A1 * | 9/2007 | Wheatley ................. B60J 7/061 296/100.18 |
| 2008/0129077 A1 | 6/2008 | Weldy |
| 2011/0169296 A1 | 7/2011 | Schrader |
| 2015/0246602 A1 | 9/2015 | Schmeichel et al. |
| 2016/0075220 A1 | 3/2016 | Williamson et al. |
| 2016/0137042 A1 | 5/2016 | Maimin et al. |
| 2016/0236555 A1 | 8/2016 | Williamson et al. |
| 2017/0129316 A1 * | 5/2017 | Williamson ............ B60J 7/104 |

OTHER PUBLICATIONS

Drawing and photocopy of a picture taken in Sep. 1999 of a tonneau cover product shown at the Big Iron Farm Show in Fargo, ND, by Shur-Co, Inc. of Yankton, SD.

Shur-Co., Inc., Oct. 1999, owner's manual.

Shur-Co., Inc., Dec. 2000, owner's manual.

ACCESS® Roll-up Cover Owner's Manual, © 1996, Agri-Cover, Inc., 8 pages.

TruXedo "Deuce2" tonneau cover system "Owner's Manual" (P/N 1117648 Rev B) was publically available on or before Sep. 13, 2013, and the Tonneau Cover System illustrated and described therein was publically on sale on or before Sep. 13, 2013.

* cited by examiner

TONNEAU COVER SYSTEM WITH SIDE RAIL MOUNTED LATCHES AND A REAR HEADER MOUNTED RELEASE ACTUATOR

FIELD

The present disclosure relates to tonneau cover systems for a cargo box of a truck, including latches to lock the header to the side rail.

BACKGROUND

This section provides background information related to the present disclosure which is not necessarily prior art.

Tonneau cover systems for a cargo box of a truck, such as a pickup, can include a tonneau cover with a rear header. The tonneau cover can be moved between a deployed configuration covering the cargo box and a rolled-up configuration allowing access to the truck box. The system can include a pair of side rails to which the rear header of the tonneau cover can be coupled when the tonneau cover is in the extended configuration covering the cargo box of the truck.

In some cases, a latch member can be mounted to one of the side rails to engage and releasably couple or lock the tonneau cover rear header to the side rail via the latch member. A user typically manually grasps, pushes or pulls a release member mounted to the side rail to disengage the latch member and unlock the header from the side rail.

When latch and release members are mounted to each of the side rails, a user must manipulate the first release member while positioned adjacent the first release member mounted to the first side rail to disengage the latch from a first end of the header. Then, the user must reposition himself or herself adjacent the second release member mounted to the second side rail on the opposite side of the truck box to manipulate the second release member and disengage the second latch from the second, opposite end of the header. Such a multi-step unlocking process is less than ideal.

SUMMARY

This section provides a general summary of the disclosure, and is not a comprehensive disclosure of its full scope or all of its features.

In accordance with one aspect of the present disclosure, a tonneau cover assembly for a truck cargo box can include a tonneau cover sized and shaped to cover the truck cargo box and including a rear header along a rear end thereof. A pair of side rails can be included with each side rail being coupleable to opposite lateral sides of the cargo box with a rear header seat coupled to the side rails. A pair of latches can be included with each latch being movably mounted to one of the side rails for movement between an unlocked position and a locked position. A release actuator can be movably mounted to the rear header extending adjacent both latches for movement between a non-release position and a release position. When the rear header is seated in the rear header seat and the release actuator is in the non-release position, each latch engages the rear header in the locked position to lock the rear header and side rails together. When the rear header is seated in the rear header seat and the release actuator is moved toward the release position, the release actuator engages both latches and moves both of the latches to the unlocked position to unlock the rear header from both of the side rails.

In accordance with another aspect of the present disclosure, a tonneau cover assembly for a truck cargo box can include a flexible roll-up tonneau cover sized and shaped to cover the truck cargo box and including a rear header along a rear end thereof. A pair of side rails can be included with each side rail being coupleable to opposite lateral sides of the cargo box with a rear header seat coupled to the side rails. A pair of latches can be included with each latch being movably mounted to one of the side rails for movement between an unlocked position and a locked position. A release actuator can be movably mounted to the rear header extending adjacent both latches for movement between a non-release position and a release position. The latches can be positioned to engage the rear header after the rear header is engaged against the rear header seat, and while the rear header is being seated in the rear header seat through rotation of the rear header engaged against the rear header seat. When the rear header is seated in the rear header seat and the release actuator is in the non-release position, each latch engages the rear header in the locked position to lock the rear header and side rails together. When the rear header is seated in the rear header seat and the release actuator is moved toward the release position, the release actuator engages both latches and moves both of the latches to the unlocked position to unlock the rear header from both of the side rails.

In accordance with another aspect of the present disclosure, a tonneau cover assembly for a truck cargo box can include a flexible roll-up tonneau cover sized and shaped to cover the truck cargo box and including a rear header along a rear end thereof. The rear header can include a header extrusion including a longitudinal channel. A pair of side rails can be included with each side rail being coupleable to opposite lateral sides of the cargo box with a rear header seat coupled to the side rails. A pair of latches can be included with each latch being movably mounted to one of the side rails for movement between an unlocked position and a locked position. A release actuator can be mounted to the header extrusion via the longitudinal channel for pivotal movement between a non-release position and a release position about a pivot axis extending along the longitudinal channel. When the rear header is seated in the rear header seat and the release actuator is in the non-release position, each latch engages the rear header in the locked position to lock the rear header and side rails together. When the rear header is seated in the rear header seat and the release actuator is moved toward the release position, the release actuator engages both latches and moves both of the latches to the unlocked position to unlock the rear header from both of the side rails.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
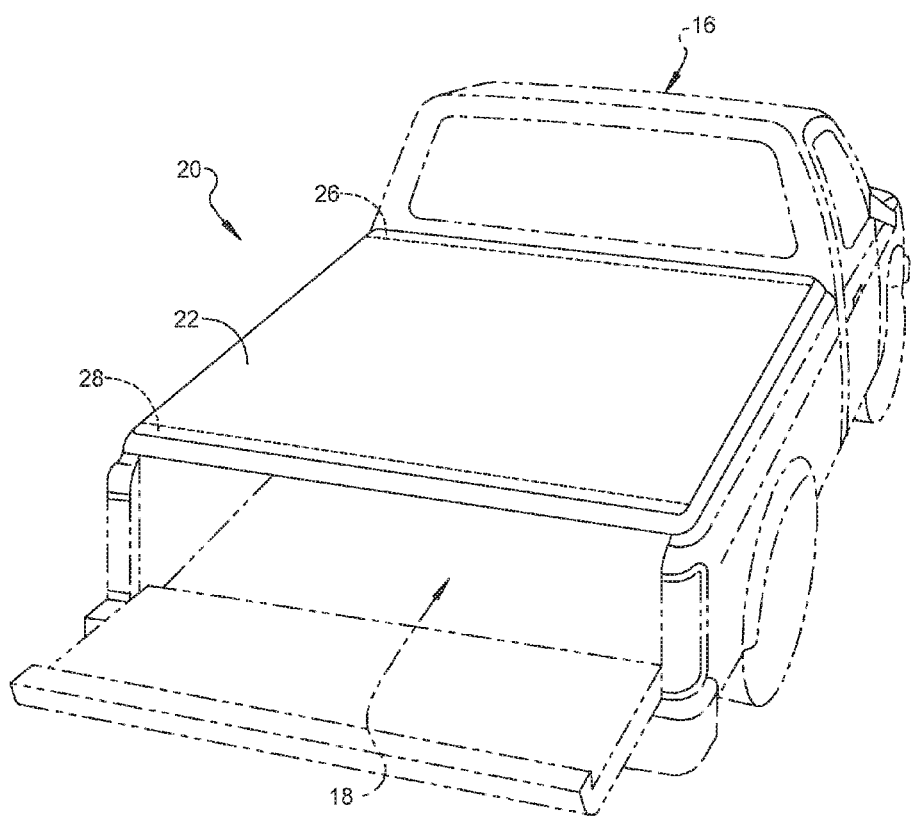
FIG. 1 is a perspective view of one exemplary embodiment of a tonneau cover system with the tonneau cover in a deployed position or configuration over the cargo box.
Figure 2:
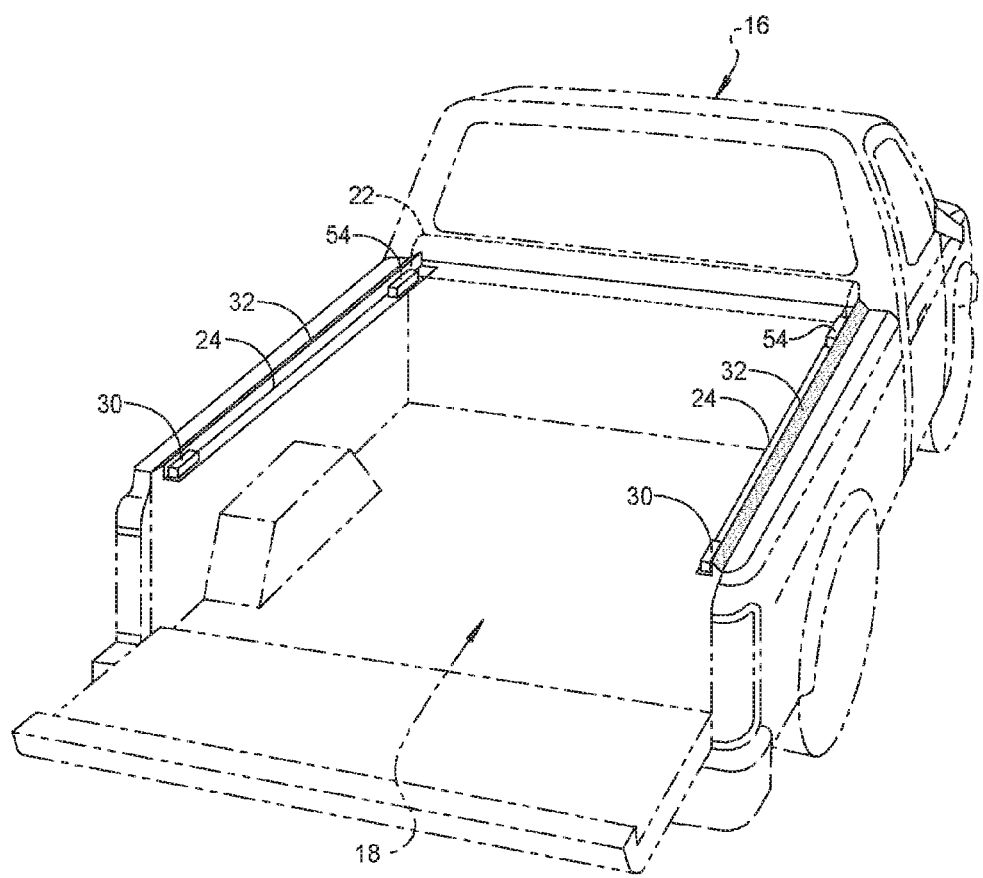
FIG. 2 is a perspective view similar to FIG. 1 with the tonneau cover shown in dashed lines in a rolled-up configuration to better show various other components of the tonneau cover system of FIG. 1.
Figure 3:
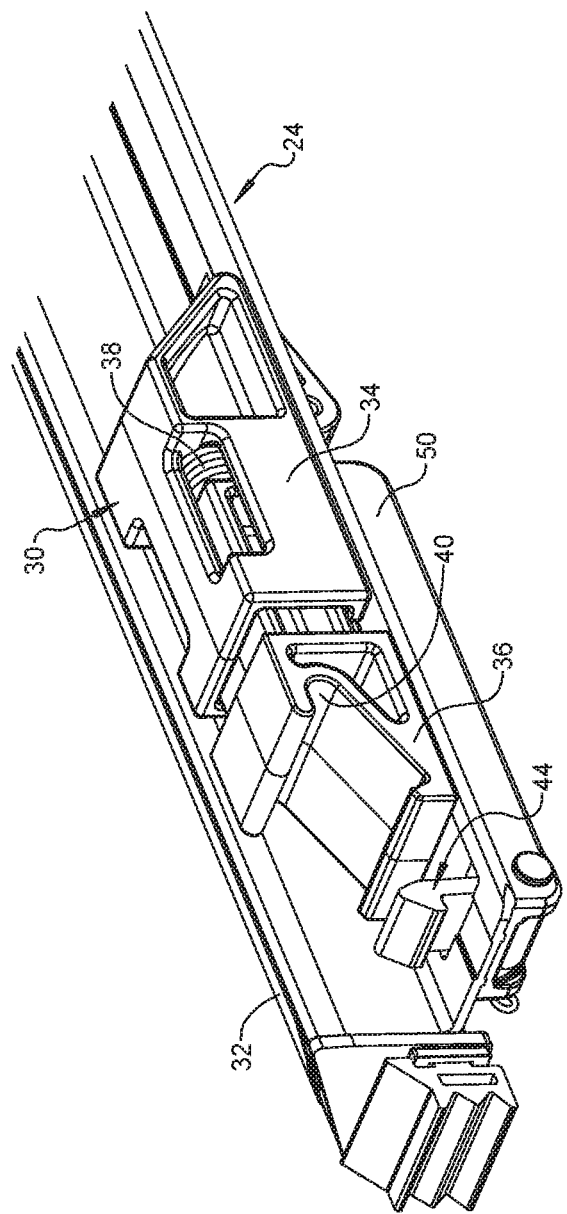
FIG. 3 is an enlarged partial perspective view of various components of the tonneau cover system of FIG. 1.
Figure 4:
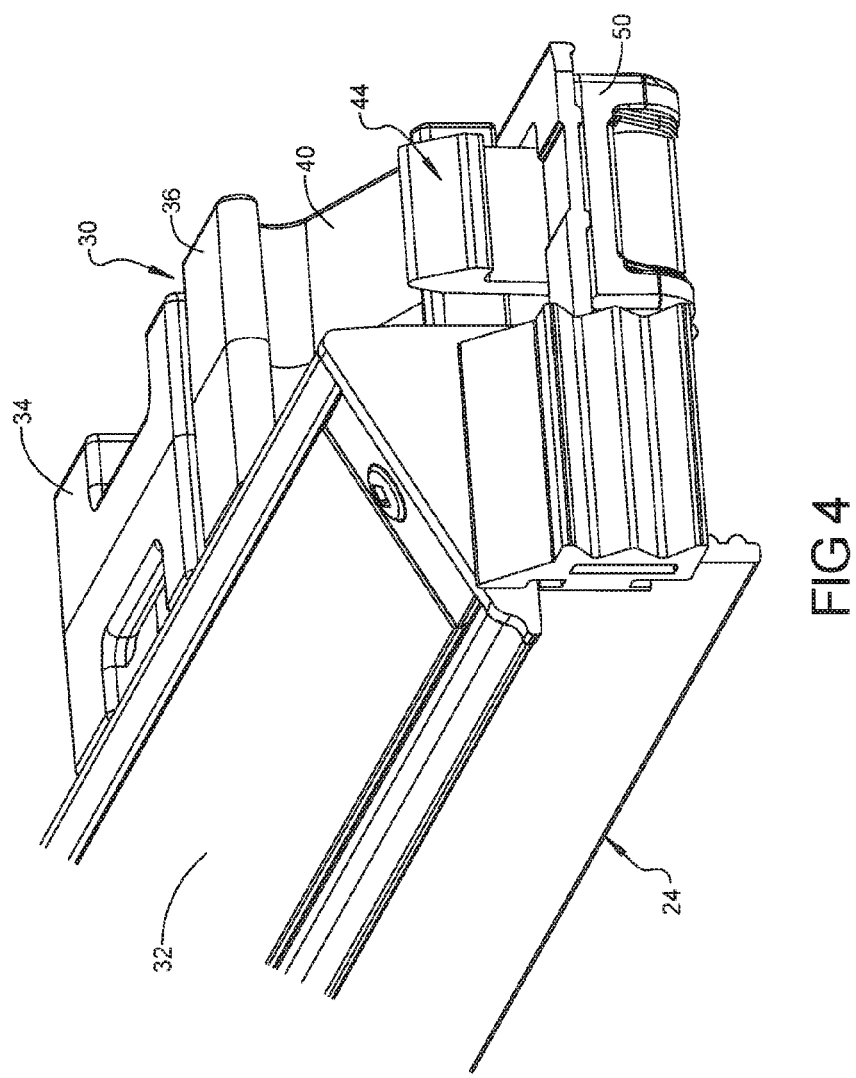
FIG. 4 is an enlarged partial perspective view of various components of the tonneau cover system of FIG. 1.
Figure 5:
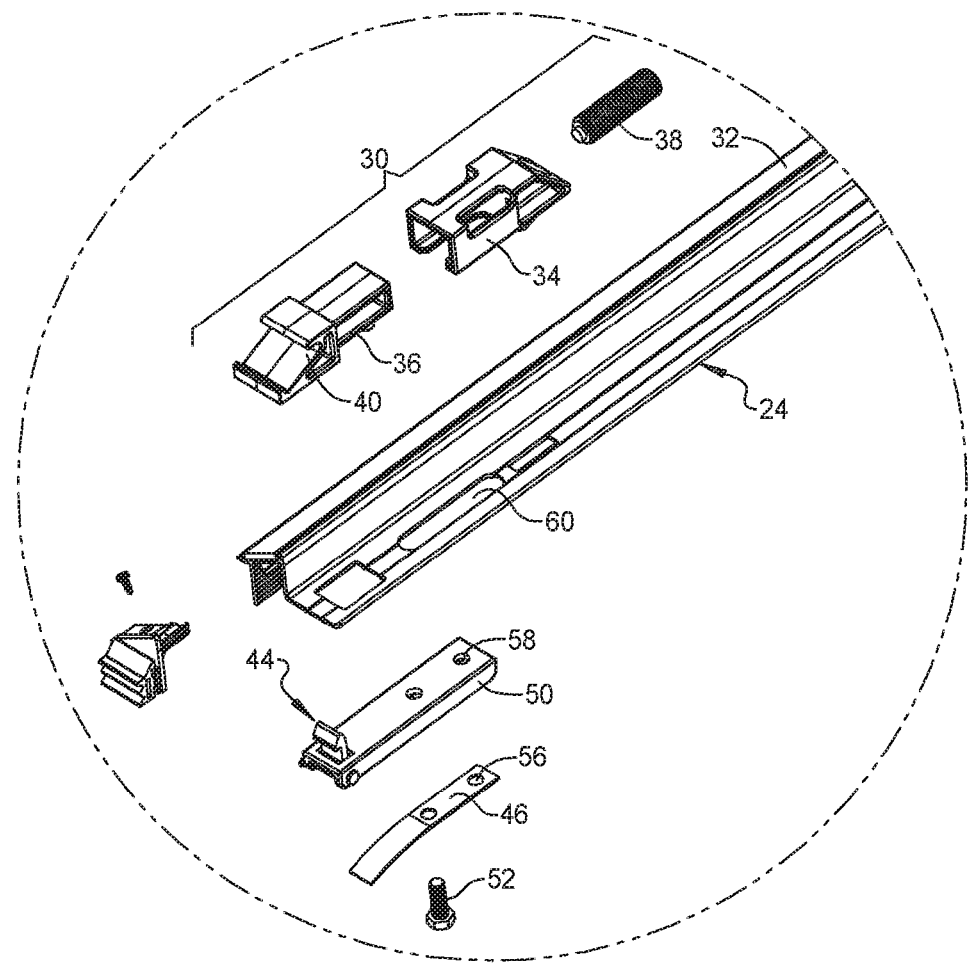
FIG. 5 is an exploded partial perspective view of various components of the tonneau cover system of FIG. 1.

Example embodiments will now be described more fully with reference to the accompanying drawings.

Referring to FIGS. 1-5, an exemplary embodiment of a tonneau cover system 20 of the present disclosure for a pickup truck 16 is illustrated. Some embodiments can include a flexible roll-up tonneau cover 22 and side rails 24 that can be clamped or otherwise positioned along opposite sides of the cargo box 18 of the pickup truck 16. The tonneau cover 22 can have a front cross rail or header 26 coupled along a front edge and a rear cross rail, or header 28 coupled along a rear edge of the tonneau cover 22.

When the tonneau cover 22 is in a deployed position or configuration over the cargo box 18 (FIG. 1), each end of the front header 26 can be coupled to one of the side rails 24, and each end of the rear header 28 can be releasably coupled to one of the side rails 24. Each of the side edges of the tonneau cover 22 can be releasably coupled to the side rails 24 via a hook and loop fastener strip 32 or other suitable mechanism.

A front header coupling, bracket or seat 54 can be coupled to each side rail 24 adjacent a forward end of the side rails 24 to couple ends of the front header 26 to the side rails 24. A rear header coupling, bracket, or seat 30 can be coupled to each side rail 24 adjacent a rear end of the side rails 24 to couple the ends of the rear header 28 to the side rails 24.

In some embodiments, the rear header seat 30 can include a first member 34 fixedly coupled to the side rail 24 and a second member 36 movable relative to the first member 34 against an adjustable seat biasing member 38 therebetween, which is a spring in the embodiment in the drawings. Thus, the rear header seat 30 can operate to bias or stretch the tonneau cover 22 when the front header 26 is coupled to the front header seats 54 and the rear header 28 is fully seated in the rear header seat 30.

In some embodiments, seating the rear header 28 in the rear header seats 30 can include positioning a forward end 39 of the rear header 28 against a forward end receiving surface 40 of the movable second member 36 of the seat 30, with a rear end 42 of the header 28 initially angled upwardly. Then, the rear end 42 of the rear header 28 can be rotated down toward the side rail 24 and into the fully seated position against the biasing force of the seat biasing member 38, causing tension in the tonneau cover 22.

Figure 7:
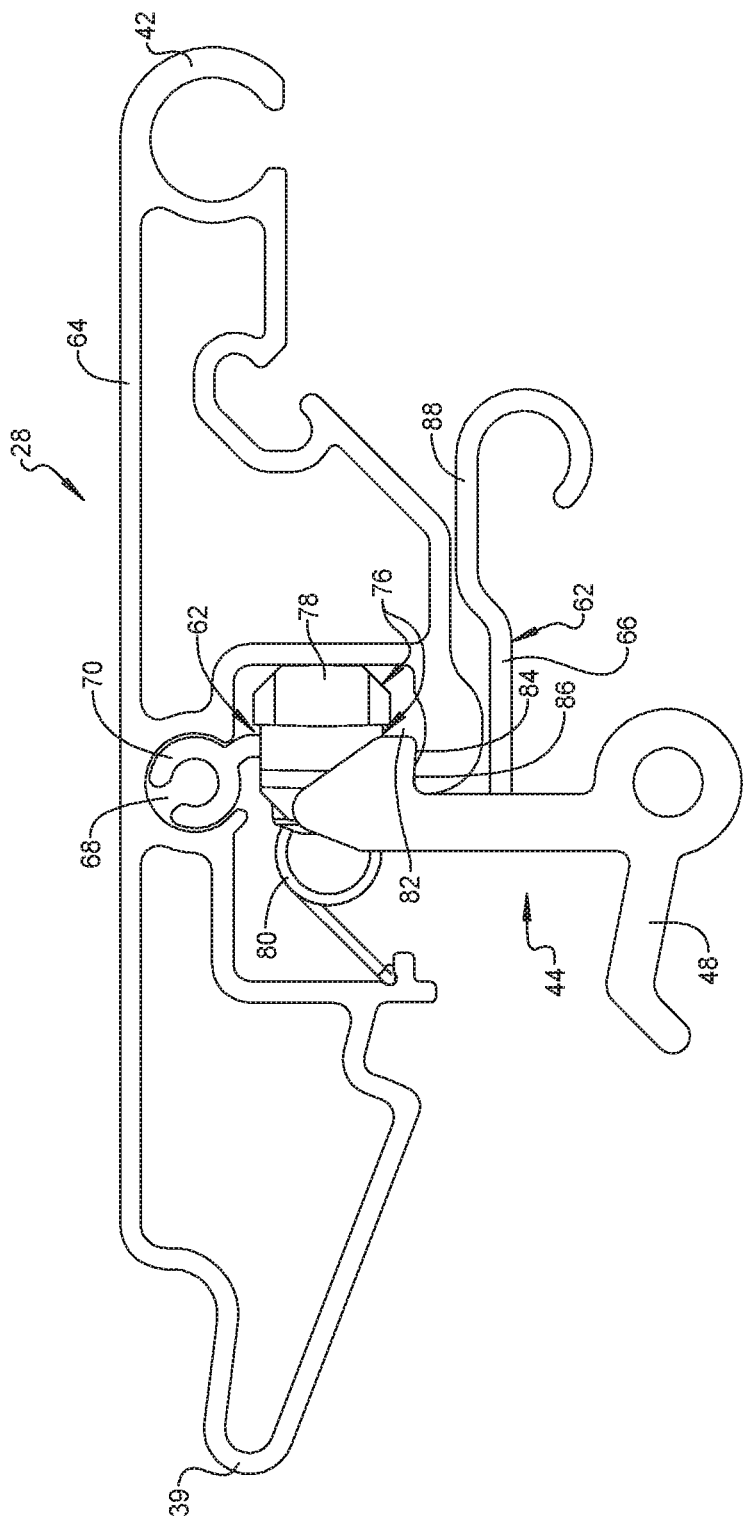
FIG. 7 is a side cross-sectional view of various components of the tonneau cover system of FIG. 1 shown relative to each other in locked and non-release positions.
Figure 8:
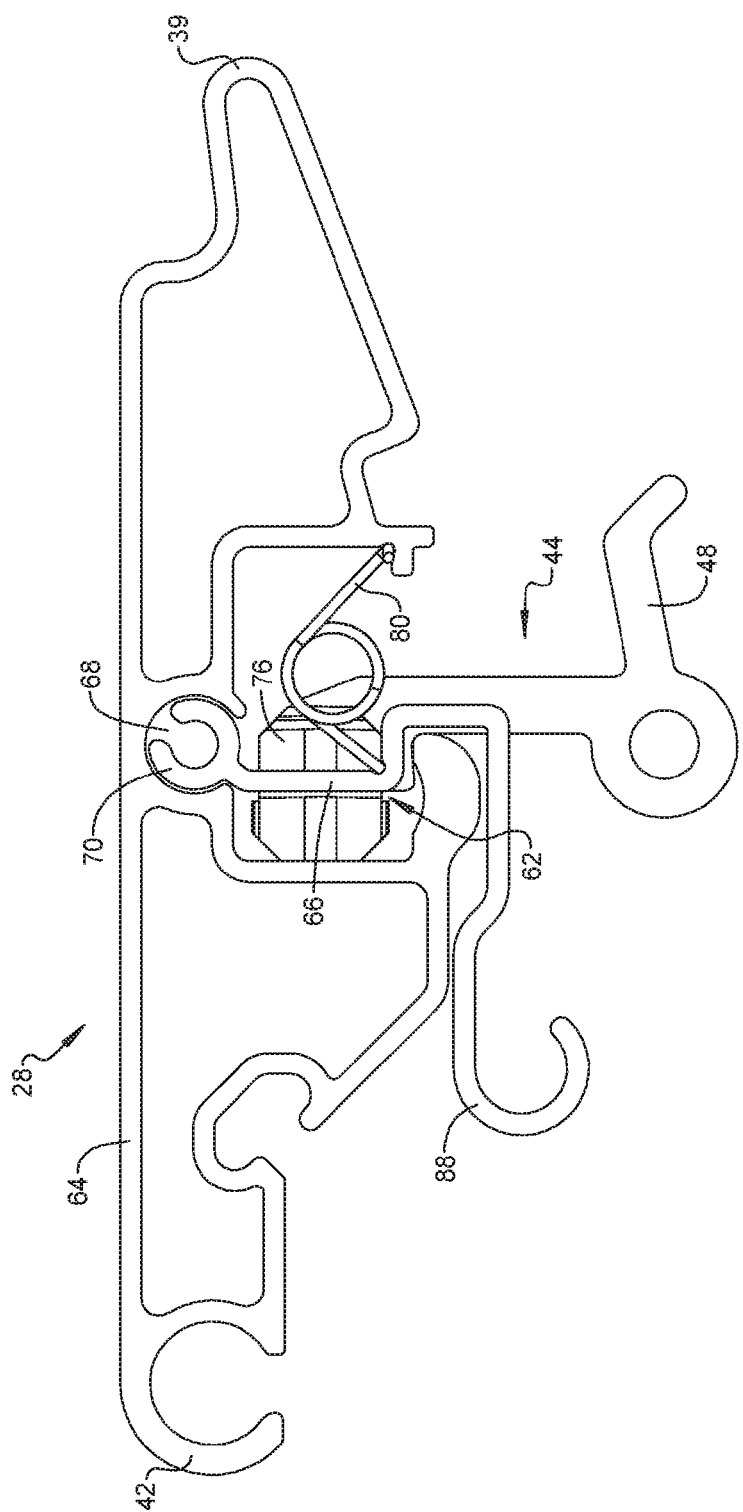
FIG. 8 is a side cross-sectional view similar to FIG. 7, but shown from the opposite side to that of FIG. 7.

Latch members or latches 44 can be movably mounted to each of the side rails 24 to cooperate with the seats 30 to lock the ends of the rear header 28 to the side rails 24 when fully seated. The latches 44 can be mounted to the side rails 24 for pivotal movement between an unlocked position (FIG. 9) and a locked position (FIGS. 7 and 8). A latch biasing member 46 can be provided to bias the latch 44 toward the locked position. For example, the latch biasing member 46 can be in the form of flat spring that engages or acts against an extending arm 48 of the latch 44.

To facilitate proper positioning of the latch 44 and the rear header seat 30 relative to each other when coupled to the side rails 24, a bracket or housing 50 can be used to couple both these components to each other and to the side rails 24. For example, a threaded fastener 52 can extend through apertures 56, 58, 60 in the flat spring 46, coupling housing 50, and side rails 24, respectively, and thread into a cooperating threaded aperture of the first member 34 of the rear header seat 30. As can be seen, one or more of these apertures 56, 58, 60 can form an elongated slot to allow for adjusting the position of these combined components relative to the rear distal edge of the side rails 24.

Figure 9:
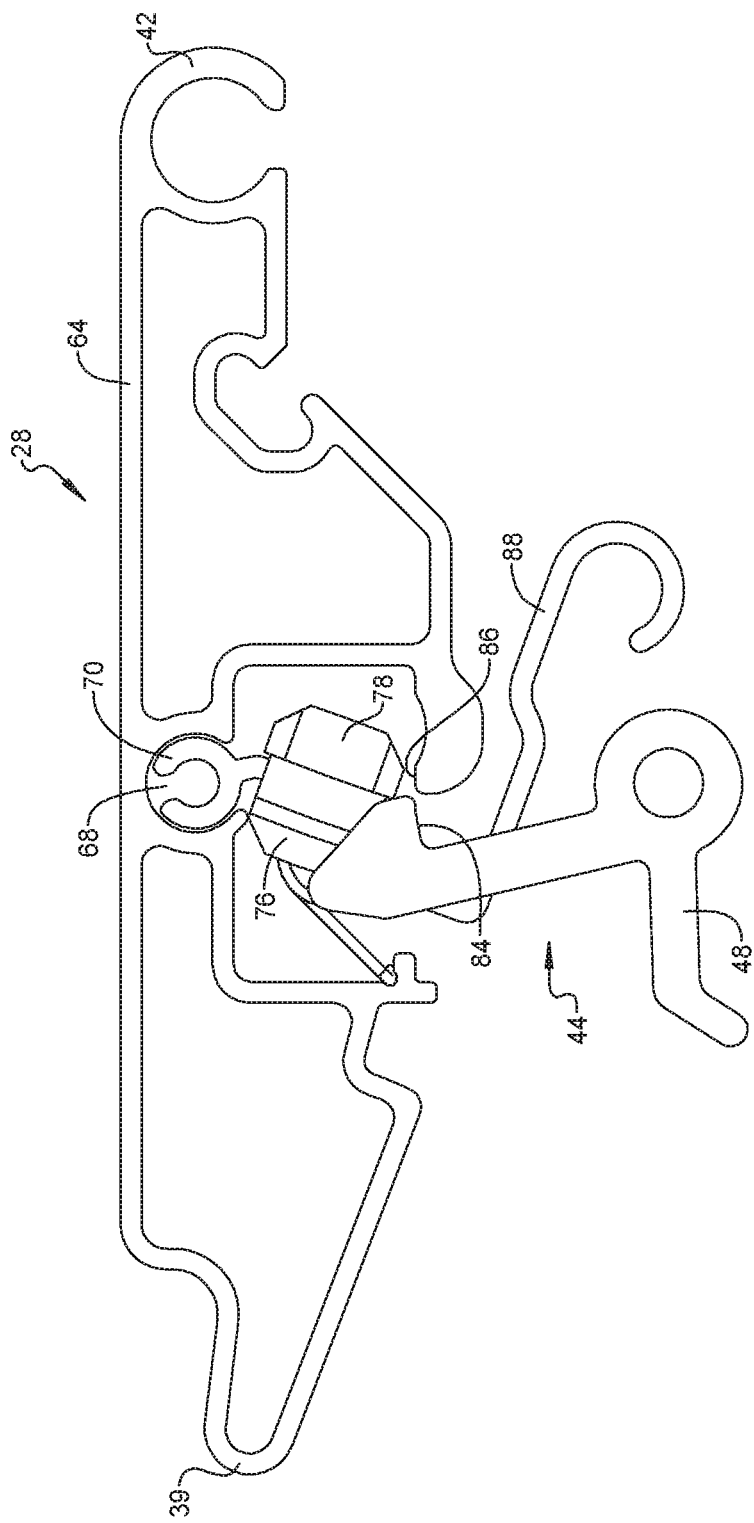
FIG. 9 is a side cross-sectional view similar to FIG. 7, but with the components of the tonneau cover system of FIG. 1 shown relative to each other in unlocked and release positions.

Referring additionally to FIGS. 6-9, a release actuator 62 can be pivotably mounted to the rear header 28 for movement between a non-release position (FIGS. 7 and 8) and a release position (FIG. 9). The release actuator 62 can be positioned to be adjacent the latches 44 when the rear header 28 is in the fully seated position. In contrast, the release actuator 62 can be positioned remote from the latches 44 mounted on the side rails 24 when the rear header 28 is not seated in the seat 30 also mounted on the side rails 24.

In some embodiments, both the rear header 28 and the release actuator 62 can include extrusion components 64 and 66, respectively. The rear header extrusion 64 can include a longitudinally extending channel 68. The release actuator extrusion 66 can include a longitudinally extending coupling portion 70 received in the channel 68 to pivotably mount the release actuator 62 to the rear header 28 to pivot about a pivot axis 79, which can be parallel to the longitudinal channel 68. Coupling the rear header extrusion 64 and the release actuator extrusion 66 together can be accomplished by sliding the coupling portion 70 into the channel 68. The header 28 can additionally include molded end caps 72 coupled to opposite ends of the rear header extrusion 64. These molded end caps 72 can include a stop surface 74 to engage against adjacent ends of the release actuator extrusion 66 and prevent longitudinal slidable movement of the release actuator extrusion 66 relative to the rear header extrusion 64.

In some embodiments, the release actuator 62 can include an elongate portion 66 and a trip arm portion 78. In some embodiments, the elongate portion 66 and the release arm portion 78 can be formed from separate components. For example, the elongate portion 66 can be provided by the metal release actuator extrusion component 66 and a separate molded plastic component 76 can provide the trip arm portion 78. The separate molded plastic trip arm component 76 can be coupled to and extend from each end of the elongate release actuator extrusion component 66. In some alternative embodiments, the trip arm portion 78 and the elongate release actuator portion 66 can both be integral portions of a single-piece component. For example, the trip arm portion 78 can simply be an integrally extending portion of the metal release actuator extrusion 66.

Figure 6:
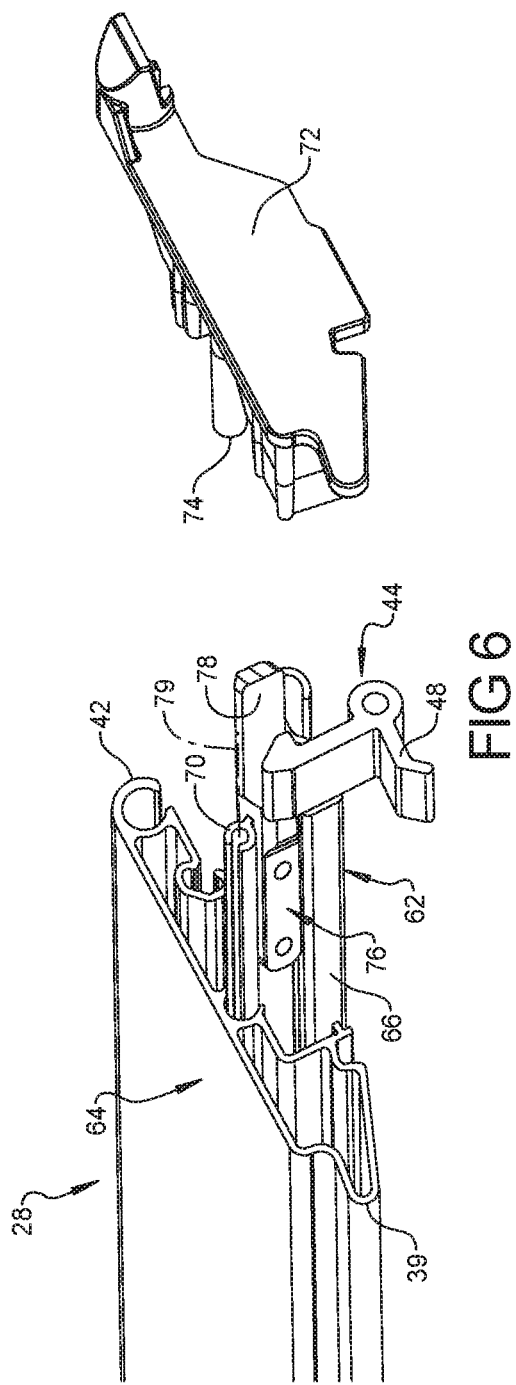
FIG. 6 is a partially exploded enlarged partial perspective view of various components of the tonneau cover system of FIG. 1.

FIGS. 6 and 7 show the latch 44 (mounted on the side rails 24) and the release actuator 62 of the rear header 28 positioned relative to each other when the rear header 28 is fully seated in the rear header seat 30, the latches 44 are in the latched position, and the release actuator 62 is in the non-release position. As in the illustrated embodiment, an actuator biasing member 80 can be provided between the rear header 28 and the release actuator 62 to bias the release actuator 62 toward the non-release position.

In some embodiments, the release actuator 62 can be spaced apart from the latches 44 when the rear header 28 is fully seated in the rear header seat 30, the latches 44 are in the latched position, and the release actuator 66 is in the non-release position. For example, in the illustrated embodiment, a gap 82 is provided between the latches 44 and the adjacent surface of the release arm 78 of the release actuator 66 when the rear header 28 is fully seated in the rear header seat 30, the latches 44 are in the latched position, and the release actuator 66 is in the non-release position.

As with the illustrated embodiment, the latches 44 can include a catch surface 84 that engages a cooperating catch surface 86 of the rear header 28 to lock the ends of the rear header 28 seated against the header seats 30 to the side rails 24 when the rear header 28 is fully seated in the rear header seat 30, the latches 44 are in the latched position, and the release actuator 66 is in the non-release position. As the rear header 28 is moved into the fully seated position, the rear header 28 engages the latches 44 and moves them toward the unlatched position against the biasing force of the latch biasing member 46 until the cooperating catch surfaces 84, 86 are properly positioned relative to each other such that each latch 44 moves back toward the latched position under the influence of the biasing member 46. Thus, the rear header 28 can be locked to both of the two side rails 24 in a single operation of moving the rear header 28 into the fully seated position in the seats 30 of the side rails.

As in the illustrated embodiment, to unlock the rear header 28 from the side rails 24, a user can manually engage a user engagement extension 88 of the release actuator 62 and can move the user engagement extension 88 from an orientation adjacent the rear header 28 in the non-release position to an orientation remote from the rear header in the release position. For example, the user engagement extension 88 of the release actuator 62 can move down and away from the rear header 28 as the release actuator 62 pivots from the non-release position (FIGS. 7 and 8) to the release position (FIG. 9). In some alternative embodiments, the user engagement extension 88 can move from an orientation remote from the rear header 28 in the non-release position to an orientation adjacent the rear header 28 in the release position, or up and toward the rear header 28.

As in the illustrated embodiment, during the movement of the release actuator 66 from the non-release position to the release position, the trip arm 78 of the release actuator 62 can move against the biasing force of the actuator biasing member 80. The trip arms 78 at each end of the release actuator 62 can engage against the respective latches 44 and can begin to move the latches 44 against the biasing force of the latch biasing members 46. In the illustrated embodiment, the latter biasing force of the latch biasing members 46 does not come into play until after the release actuator 62 moves to a position in which it closes the gap 82 between the trip arms 78 and the latches 44.

In some alternative embodiments, where there is no gap 82 and no actuator biasing member 80, then the only biasing force that needs to be overcome can be that of the latch biasing members 46. In any event, the rear header 28 can be unlocked from both of the two side rails 24 in a single manual actuation or operation of the release actuator 62, to allow the rear header 28 to be moved out of the seated position in the seat 30 and away from the rear end of the side rails 24 toward a forward end of the side rails 24.

Example embodiments are provided so that this disclosure will be thoroughly understandable to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "mounted to," or "coupled to" another element or layer, it may be directly on, engaged, connected or coupled to the other element or layer, or intervening elements or layers may be present. In contrast, when an element is referred to as being "directly on," "directly engaged to," "directly connected to," "directly mounted to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover assembly for a truck cargo box, the tonneau cover assembly comprising:
    a tonneau cover sized and shaped to cover the truck cargo box and including a rear header along a rear end thereof;
    a pair of side rails, each side rail being coupleable to one of opposite lateral sides of the cargo box with a rear header seat coupled to each side rail;
    a pair of latches, each latch being movably mounted to one of the side rails for movement between an unlocked position and a locked position;
    a release actuator movably mounted to the rear header extending adjacent both latches for movement between a non-release position and a release position;
    wherein, when the rear header is seated in the rear header seat and the release actuator is in the non-release position, each latch engages the rear header in the locked position to lock the rear header and side rails together;
    wherein, when the rear header is seated in the rear header seat and the release actuator is moved toward the release position, the release actuator engages both latches and moves both of the latches to the unlocked position to unlock the rear header from both of the side rails.

2. The tonneau cover assembly of claim 1, wherein latch biasing members bias the latches toward the locked position and a release biasing member biases the release actuator toward the non-release position.

3. The tonneau cover assembly of claim 1, wherein a release biasing member biases the release actuator toward the non-release position.

4. The tonneau cover assembly of claim 1, wherein the release actuator is spaced apart from the latches when the rear header is seated in the rear header seat, the latches are in the latched position, and the release actuator is in the non-release position.

5. The tonneau cover assembly of claim 1, wherein the rear header comprises a header extrusion including a longitudinal channel and the release actuator is pivotably mounted to the header extrusion via the longitudinal channel for pivotal movement about a pivot axis between the non-release position and the release position.

6. The tonneau cover assembly of claim 5, further comprising an end cap coupled to each end of the rear header extrusion and providing a stop surface positioned to engage an adjacent end of the release extrusion to prevent longitudinal sliding movement of the release extrusion along the longitudinal channel.

7. The tonneau cover assembly of claim 1, wherein the release actuator comprises an elongate portion and a trip arm portion adjacent each end of the elongate portion to engage the latches.

8. The tonneau cover assembly of claim 7, wherein the elongate portion and trip arm portions are separate components, and each trip arm portion component is fixedly coupled to the elongate portion component for pivotable movement relative thereto.

9. The tonneau cover assembly of claim 1, wherein the release actuator is pivotably mounted to the rear header and comprises a user engagement extension, and the user engagement extension of the release actuator is movable from an orientation adjacent the rear header in the non-release position to an orientation remote from the rear header in the release position.

10. The tonneau cover assembly of claim 1, wherein the tonneau cover is a flexible roll-up tonneau cover.

11. The tonneau cover assembly of claim 1, wherein the release actuator is movably mounted to the rear header to pivot between the non-release position and the release position.

12. The tonneau cover assembly of claim 1, wherein a release biasing member positioned between the rear header and the release actuator biases the release actuator toward the non-release position, and wherein the release actuator is spaced apart from the latches when the rear header is seated in the rear header seat, the latches are in the latched position, and the release actuator is in the non-release position.

13. A tonneau cover assembly for a truck cargo box, the tonneau cover assembly comprising:
    a flexible roll-up tonneau cover sized and shaped to cover the truck cargo box and including a rear header along a rear end thereof;
    a pair of side rails, each side rail being coupleable to one of opposite lateral sides of the cargo box with a rear header seat coupled to each side rail;
    a pair of latches, each latch being spaced from the rear header seat and movably mounted to one of the side rails for movement between an unlocked position and a locked position;
    a release actuator movably mounted to the rear header extending adjacent both latches for movement between a non-release position and a release position;
    wherein the latches are positioned to engage the rear header after the rear header is engaged against the rear header seat, and while the rear header is being seated in the rear header seat through rotation of the rear header engaged against the rear header seat;
    wherein, when the rear header is seated in the rear header seat and the release actuator is in the non-release position, each latch engages the rear header in the locked position to lock the rear header and side rails together;
    wherein, when the rear header is seated in the rear header seat and the release actuator is moved toward the release position, the release actuator engages both latches and moves both of the latches to the unlocked position to unlock the rear header from both of the side rails.

14. The tonneau cover assembly of claim 13, wherein the rear header seat comprises a fixed component and a movable component with a biasing member therebetween.

15. The tonneau cover assembly of claim 13, wherein latch biasing members bias the latches toward the locked position and a release biasing member biases the release actuator toward the non-release position.

16. The tonneau cover assembly of claim 13, wherein the rear header comprises a header extrusion including a longitudinal channel and the release actuator is pivotably mounted to the header extrusion via the longitudinal channel for pivotal movement about a pivot axis extending along the longitudinal channel between the non-release position and the release position.

17. The tonneau cover assembly of claim 13, wherein the release actuator is pivotably mounted to the rear header and comprises a user engagement extension, and the user engagement extension of the release actuator is movable from an orientation adjacent the rear header in the non-release position to an orientation remote from the rear header in the release position.

18. A tonneau cover assembly for a truck cargo box, the tonneau cover assembly comprising:
   a flexible roll-up tonneau cover sized and shaped to cover the truck cargo box and including a rear header along a rear end thereof, the rear header including a header extrusion including a longitudinal channel;
   a pair of side rails, each side rail being coupleable to one of opposite lateral sides of the cargo box with a rear header seat coupled to each side rail;
   a pair of latches, each latch being spaced from the rear header seat and movably mounted to one of the side rails for movement between an unlocked position and a locked position;
   a release actuator mounted to the header extrusion via the longitudinal channel for pivotal movement between a non-release position and a release position about a pivot axis extending along the longitudinal channel;
   wherein, when the rear header is seated in the rear header seat and the release actuator is in the non-release position, each latch engages the rear header in the locked position to lock the rear header and side rails together;
   wherein, when the rear header is seated in the rear header seat and the release actuator is moved toward the release position, the release actuator engages both latches and moves both of the latches to the unlocked position to unlock the rear header from both of the side rails.

19. The tonneau cover assembly of claim 18, wherein the release actuator comprises a user engagement extension, and the user engagement extension of the release actuator is movable from an orientation adjacent the rear header in the non-release position to an orientation remote from the rear header in the release position.

20. The tonneau cover assembly of claim 18, wherein latch biasing members bias the latches toward the locked position and a release biasing member biases the release actuator toward the non-release position.

* * * * *